United States Patent
Harada et al.

(10) Patent No.: US 8,277,536 B2
(45) Date of Patent: Oct. 2, 2012

(54) PROCESS FOR PRODUCING MOLTEN IRON AND APPARATUS FOR PRODUCING MOLTEN IRON

(75) Inventors: Takao Harada, Kobe (JP); Hidetoshi Tanaka, Shinagawa-ku (JP); Kiminori Hajika, Kobe (JP); Tadashi Yaso, Kobe (JP); Toshiyuki Kurakake, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/117,231

(22) Filed: May 27, 2011

(65) Prior Publication Data

US 2011/0226092 A1  Sep. 22, 2011

Related U.S. Application Data

(63) Continuation of application No. 12/298,201, filed as application No. PCT/JP2007/055379 on Mar. 16, 2007, now Pat. No. 7,993,430.

(30) Foreign Application Priority Data

Apr. 25, 2006 (JP) ................. 2006-120900

(51) Int. Cl.
*C21B 13/08* (2006.01)
*C21B 13/10* (2006.01)
*C22B 1/24* (2006.01)

(52) U.S. Cl. .................................. 75/484; 75/584
(58) Field of Classification Search .............. 75/484, 75/548

See application file for complete search history.

(56) References Cited

U.S. PATENT DOCUMENTS

| 4,701,214 A | 10/1987 | Kaneko et al. |
| 7,160,353 B2 | 1/2007 | Kobayashi et al. |
| 7,384,450 B2 | 6/2008 | Kikuchi |

(Continued)

FOREIGN PATENT DOCUMENTS

JP  57 98636  6/1982

(Continued)

OTHER PUBLICATIONS

Derwent Acc 1989-2678203 for Patent family JP 01195227A, published Aug. 7, 1989 and JP 95098969 B2, published Oct. 25, 1995.

(Continued)

*Primary Examiner* — George Wyszomierski
*Assistant Examiner* — Tima M McGuthry Banks
(74) *Attorney, Agent, or Firm* — Oblon, Spivak, McClelland, Maier & Neustadt, L.L.P.

(57) ABSTRACT

A process for producing molten iron with a combination of a moving-hearth reducing furnace and an iron bath-type melting furnace that includes charging a bedding carbonaceous material on a hearth of the moving-hearth reducing furnace and placing carbonaceous material-containing agglomerates containing a powdery iron oxide source and a powdery carbonaceous reductant on the bedding carbonaceous material; thermally reducing the carbonaceous material-containing agglomerates while moving the hearth in the moving-hearth reducing furnace to generate solid reduced iron and simultaneously thermally carbonizing the bedding carbonaceous material to generate char; hot-forming the solid reduced iron and the char into agglomerates without substantial cooling; continuously charging the agglomerates into the iron bath-type melting furnace from thereabove; and blowing oxygen-containing gas into the iron bath-type melting furnace to melt the solid reduced iron and to thereby generate molten iron.

2 Claims, 7 Drawing Sheets

U.S. PATENT DOCUMENTS

| | | |
|---|---|---|
| 7,993,430 B2 | 8/2011 | Harada et al. |
| 8,157,888 B2 * | 4/2012 | Ito et al. .......................... 75/484 |
| 2001/0027701 A1 | 10/2001 | Ito et al. |
| 2003/0047038 A1 | 3/2003 | Iwasaki et al. |
| 2004/0168549 A1 | 9/2004 | Kobayashi et al. |
| 2005/0087039 A1 | 4/2005 | Kikuchi |
| 2007/0295165 A1 | 12/2007 | Tanaka et al. |
| 2010/0037728 A1 | 2/2010 | Sugitatsu et al. |

FOREIGN PATENT DOCUMENTS

| | | |
|---|---|---|
| JP | 57-98636 | 6/1982 |
| JP | 1 195220 | 8/1989 |
| JP | 1-195220 | 8/1989 |
| JP | 3-60883 | 9/1991 |
| JP | 11 310814 | 11/1999 |
| JP | 11-310814 | 11/1999 |
| JP | 2001 279315 | 10/2001 |
| JP | 2002 47507 | 2/2002 |
| JP | 2003239008 | 3/2003 |
| JP | 2003 155509 | 5/2003 |
| JP | 2003-213312 | 7/2003 |
| JP | 2004-176170 | 6/2004 |
| JP | 2006-152432 | 6/2006 |
| JP | 2006 152432 | 6/2006 |
| WO | 01 18256 | 3/2001 |
| WO | 2006 046606 | 5/2006 |

OTHER PUBLICATIONS

Machine translation for JP 95098969, published Oct. 25, 1995.
Machine translation for JP 2003-239008 A, published Aug. 27, 2003.

\* cited by examiner (a)

(b)

(a)

(b)

PROCESS FOR PRODUCING MOLTEN IRON AND APPARATUS FOR PRODUCING MOLTEN IRON

CROSS-REFERENCE TO RELATED APPLICATIONS

This application is a continuation application of U.S. Ser. No. 12/298,201 filed Oct. 23, 2008, now U.S. Pat. No. 7,993,430, which is a National Stage of PCT/JP07/55379 filed Mar. 16, 2007 and claims the benefit of JP 2006-120900 filed Apr. 25, 2006.

TECHNICAL FIELD

The present invention relates to improvements of technology for producing metallic iron by thermally reducing an iron source such as iron ore or the like with a carbonaceous reductant such as coke or the like. In particular it relates to an improved process by which metallic iron with controlled carbon concentrations can be produced in high yield, the method including efficiently reducing iron oxides into metallic iron at a lower operation temperature while conducting carburization, and efficiently separating the generated metallic iron from slag-forming components such as gangue components contained in raw material ore.

BACKGROUND ART

For a molten iron production process using a rotary hearth furnace (moving hearth reducing furnace) connected to a smelting reducing furnace (iron bath-type melting furnace), Kaneko et al. have suggested a process for producing molten iron by a so-called smelting reduction method including preliminarily reducing, in a rotary hearth furnace, compacts (carbonaceous material-containing agglomerates) made by agglomerating fine powder ore (powdery iron oxide source) and fine powder carbonaceous material (powdery carbonaceous reductant); continuously charging, with a charge shoot or the like, the preliminarily reduced compacts (solid reduced iron) into the smelting reducing furnace (iron bath-type melting furnace) in which a molten metal bath is generated; burning a fuel and a fine powder carbonaceous material (carbonaceous material) supplied as a reductant under excess oxygen to conduct secondary combustion while smelting and reducing the preliminarily reduced compacts to obtain a molten iron bath; and introducing high-temperature discharge gas from the smelting reducing furnace into the rotary hearth furnace to effectively utilize the discharge gas (refer to Patent Document 1).

However, the smelting reducing method described above has many drawbacks as described below that remain unresolved and has not yet put into practical application. Namely, the discharge gas from the smelting reducing furnace contains large quantities of dust which adheres and deposits on the furnace wall or the like of the rotary hearth furnace, the purity of the produced iron tends to be instable due to fluctuation of the calorific value or the like of the discharge gas caused by fluctuation of heat in the smelting reducing furnace, and incorporation of a high FeO slag in the dust contained in the discharge gas would erode the hearth refractory.

In this respect, the inventors of the present invention have developed a process for producing molten iron in a rotary hearth furnace (moving hearth reducing furnace) connected to a melting furnace (iron bath-type melting furnace), the process including thermally reducing compacts containing iron oxides and a carbonaceous reductant on a rotary hearth to produce solid reduced iron with a metallization ratio of 60% or more, feeding the resultant solid reduced iron to the melting furnace, and melting the solid reduced iron while burning the carbonaceous material supplied as a fuel with oxygen and controlling the secondary combustion ratio in the melting furnace to 40% or less so as to obtain a molten iron bath. The inventors have also suggested that the thermal efficiency and the like of the process as a whole can be improved by supplying all or part of the carbonaceous material, which is used as a fuel to be fed to the melting furnace, on a hearth so that the carbonaceous material is used as a bedding carbonaceous material (refer to Patent Document 2).

According to this process, erosion of the furnace refractory can be suppressed as much as possible and molten iron with high iron purity can be produced with high production efficiency. However, as in typical practice, when the bedding carbonaceous material (char) whose weight is reduced by carbonization in the rotary hearth furnace is continuously fed into the melting furnace from above the melting furnace, part of the bedding carbonaceous material scatters into a space (free space) in the upper part of the melting furnace before reaching the surface of the molten bath, and becomes dispersed in the discharge gas from the melting furnace, thereby leading to a decrease in yield of the carbonaceous material. Thus, there has been room for improvements.

On the other hand, applicant of the present invention has suggested a process for producing metallic iron by spreading a powdery bedding carbonaceous material for atmospheric control on a hearth of a rotary hearth furnace, feeding a raw material containing an iron oxide-containing substance and a carbonaceous reductant, and reducing and melting the raw material under heating in the furnace, in which the bedding carbonaceous material discharged from the rotary hearth furnace is recycled and used in the rotary hearth furnace to prevent the powdery bedding carbonaceous material from accreting into a cracker-like material (refer to Patent Document 3).

However, the above-mentioned process does not involve a melting furnace and produces metallic iron by using only the rotary hearth furnace. Thus, the process is inherently free from the problem of scattering of the bedding carbonaceous material into discharge gas from the melting furnace, and cannot be directly applied to a molten iron production process involving a combination of a rotary hearth furnace and a melting furnace.

Patent Document 1: Japanese Examined Patent Application Publication No. 3-60883 (Claims, FIG. 2, etc.)
Patent Document 2: Japanese Unexamined Patent Application Publication No. 2004-176170 (Claims and [0039] to [0042])
Patent Document 3: Japanese Unexamined Patent Application Publication No. 2003-213312 (Claims, FIG. 1, etc.)

DISCLOSURE OF INVENTION

The present invention has been made under the aforementioned circumstances. In a molten iron production process in which a moving-hearth reducing furnace and an iron bath-type melting furnace are combined and part or all of the carbonaceous materials supplied as a fuel for the iron bath-type melting furnace are supplied as a bedding carbonaceous material on a hearth of the rotary hearth furnace, the present invention aims to provide a molten iron production process and molten iron production apparatus that can suppress scattering of the bedding carbonaceous material into the discharge gas from the iron bath-type melting furnace during charging of the bedding carbonaceous material into the iron bath-type melting furnace.

A molten iron production process according to one aspect of the present invention achieving the object is a process for producing molten iron with a combination of a moving-hearth reducing furnace and an iron bath-type melting furnace, including:

a step of charging a bedding carbonaceous material having an average particle diameter of 1 to 5 mm on a hearth of the moving-hearth reducing furnace and placing carbonaceous material-containing agglomerates containing a powdery iron oxide source and a powdery carbonaceous reductant on the bedding carbonaceous material;

a step of thermally reducing the carbonaceous material-containing agglomerates while moving the hearth in the moving-hearth reducing furnace to generate solid reduced iron and simultaneously thermally carbonizing the bedding carbonaceous material to generate char;

a step of continuously charging the solid reduced iron and the char into the iron bath-type melting furnace from thereabove without substantial cooling; and a step of blowing oxygen-containing gas into the iron bath-type melting furnace to melt the solid reduced iron and to thereby generate molten iron.

A molten iron production process according to another aspect of the present invention achieving the object is a process for producing molten iron with a combination of a moving-hearth reducing furnace and an iron bath-type melting furnace, including:

a step of charging a bedding carbonaceous material on a hearth of the moving-hearth reducing furnace and placing carbonaceous material-containing agglomerates containing a powdery iron oxide source and a powdery carbonaceous reductant on the bedding carbonaceous material;

a step of thermally reducing the carbonaceous material-containing agglomerates while moving the hearth in the moving-hearth reducing furnace to generate solid reduced iron and simultaneously thermally carbonizing the bedding carbonaceous material to generate char;

a step of classifying the solid reduced iron and the char into a coarse particle portion having an average particle diameter of 1 mm or more and the rest, a fine particle portion without substantial cooling;

a step of continuously charging only the coarse particle portion into the iron bath-type melting furnace from thereabove; and a step of blowing oxygen-containing gas into the iron bath-type melting furnace to melt the solid reduced iron and to thereby generate molten iron.

A molten iron production process according to yet another aspect of the present invention achieving the object is a process for producing molten iron with a combination of a moving-hearth reducing furnace and an iron bath-type melting furnace, including:

a step of charging a bedding carbonaceous material on a hearth of the moving-hearth reducing furnace and placing carbonaceous material-containing agglomerates containing a powdery iron oxide source and a powdery carbonaceous reductant on the bedding carbonaceous material;

a step of thermally reducing the carbonaceous material-containing agglomerates while moving the hearth in the moving-hearth reducing furnace to generate solid reduced iron and simultaneously thermally carbonizing the bedding carbonaceous material to generate char;

a step of hot-forming the solid reduced iron and the char into agglomerates without substantial cooling;

a step of continuously charging the agglomerates into the iron bath-type melting furnace from thereabove; and a step of blowing oxygen-containing gas into the iron bath-type melting furnace to melt the solid reduced iron and to thereby generate molten iron.

A molten steel production apparatus of still another aspect of the present invention achieving the object is an apparatus for producing molten iron with a combination of a moving-hearth reducing furnace and an iron bath-type melting furnace, including:

bedding charging means for charging a bedding carbonaceous material on a hearth of the moving-hearth reducing furnace;

raw material charging means for placing carbonaceous material-containing agglomerates containing a powdery iron oxide source and a powdery carbonaceous reductant on the bedding carbonaceous material;

heating means for thermally reducing the carbonaceous material-containing agglomerates while moving the hearth in the moving-hearth reducing furnace to generate solid reduced iron and simultaneously thermally carbonizing the bedding carbonaceous material to generate char;

classifying means for classifying the solid reduced iron and the char into a coarse particle portion having an average particle diameter of 1 mm or more and the rest, a fine particle portion without substantial cooling;

melting furnace charging means for continuously charging only the coarse particle portion into the iron bath-type melting furnace from thereabove; and oxygen blowing means for blowing oxygen-containing gas into the iron bath-type melting furnace to melt the solid reduced iron and to thereby generate molten iron.

A molten steel production apparatus of another aspect of the present invention achieving the object is an apparatus for producing molten iron with a combination of a moving-hearth reducing furnace and an iron bath-type melting furnace, including:

bedding charging means for charging a bedding carbonaceous material on a hearth of the moving-hearth reducing furnace;

raw material charging means for placing carbonaceous material-containing agglomerates containing a powdery iron oxide source and a powdery carbonaceous reductant on the bedding carbonaceous material;

heating means for thermally reducing the carbonaceous material-containing agglomerates while moving the hearth in the moving-hearth reducing furnace to generate solid reduced iron and simultaneously thermally carbonizing the bedding carbonaceous material to generate char;

agglomerating means for hot-forming the solid reduced iron and the char into agglomerates without substantial cooling;

melting furnace charging means for continuously charging the agglomerates into the iron bath-type melting furnace from thereabove; and oxygen blowing means for blowing oxygen-containing gas into the iron bath-type melting furnace to melt the solid reduced iron and to thereby generate molten iron.

BEST MODES FOR CARRYING OUT THE INVENTION

The present invention will now be described in further detail with reference to drawings showing one embodiment of the present invention.

First Embodiment

Figure 1:
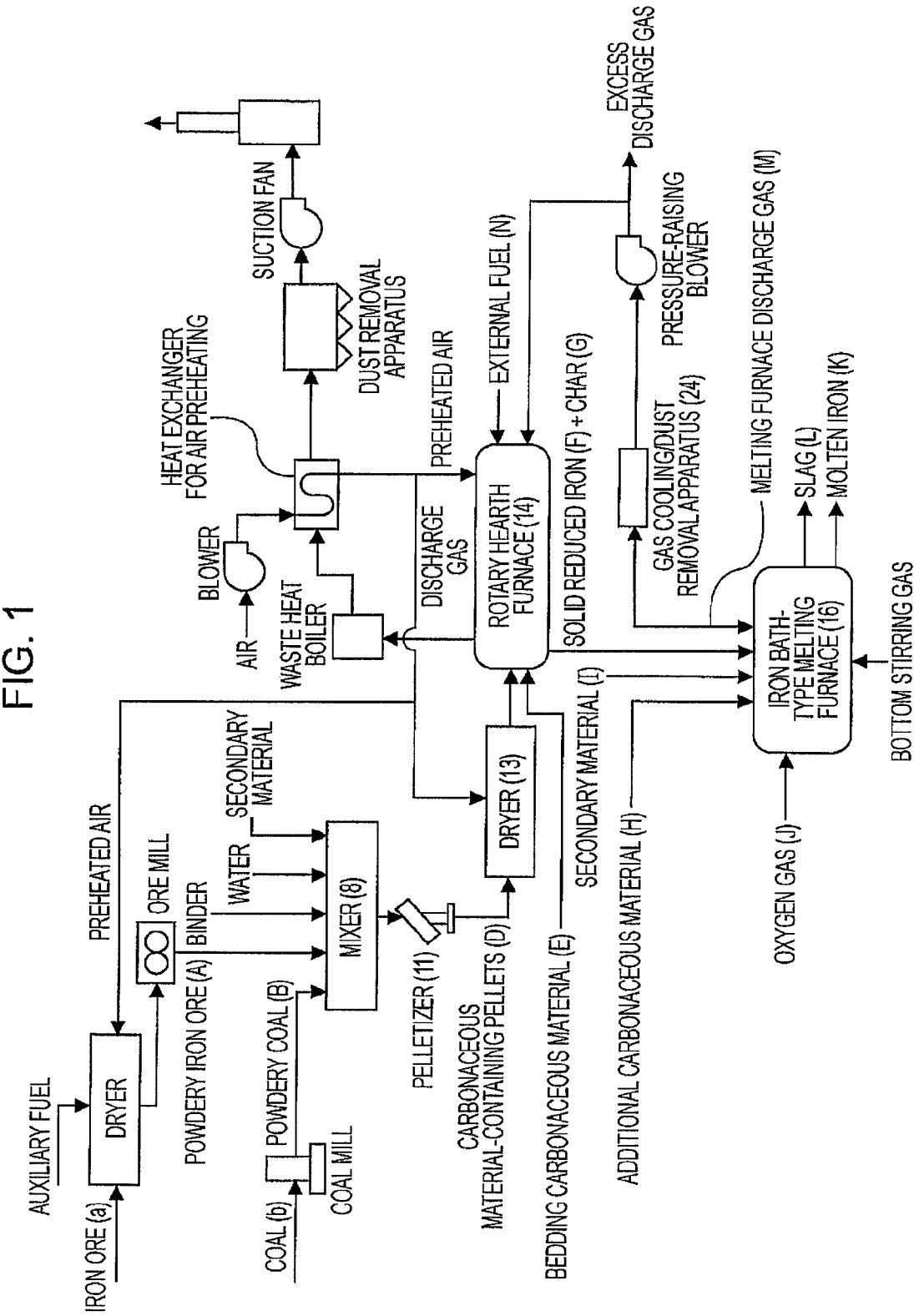
FIG. 1 A flow diagram of a molten iron production process showing one embodiment of the present invention.

FIG. 1 is a flow diagram of a molten iron production process showing one embodiment of the present invention. The molten iron production process is designed by combining a rotary hearth furnace 14, i.e., a moving hearth reducing furnace, and an iron bath-type melting furnace 16.

Iron ore a as an iron oxide source and coal b as a carbonaceous reductant are, if necessary, separately crushed into powders having a particle diameter of about less than 1 mm. Resultant powdery iron ore A as a powdery iron oxide source and powdery coal B as a powdery carbonaceous reductant are mixed with each other at a particular ratio. Adequate amounts of binder and/or water is added to the mixture if necessary (optionally, all or part of a secondary material I as a slag-forming material added to the iron bath-type melting furnace 16 may be added at this stage), and the resulting mixture was mixed in a mixer 8. The mixture is then pelletized into carbonaceous charging pellets D, i.e., carbonaceous material-containing agglomerates, having a pellet size of about 6 to 20 mm by using a pelletizer 11. The volatile content in the coal (carbonaceous reductant) b is preferably about 30 mass % or less since an excessively high volatile content is likely to cause bursting (explosion) of the carbonaceous charging pellets D when heated in the rotary hearth furnace 14.

In order to prevent the bursting explosion inside the rotary hearth furnace 14, the carbonaceous charging pellets D are preferably dried in advance in a dryer 13 so that the moisture content is about 1 mass % or less.

(1) Reducing Furnace Charging Step (Step of Placing Carbonaceous Material-Containing Agglomerates into Reducing Furnace)

Figure 2:
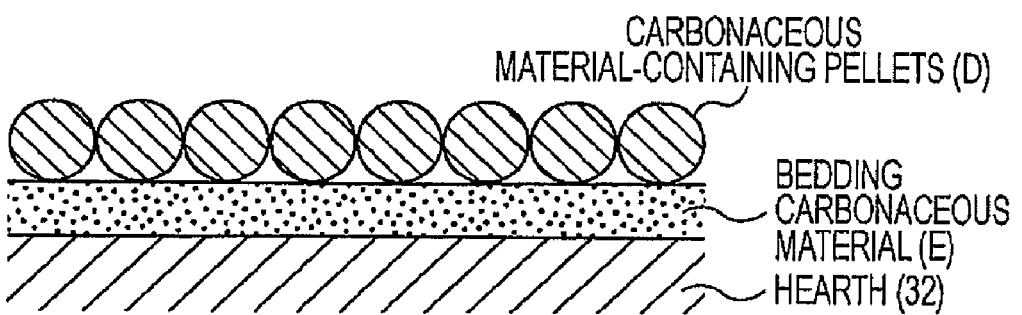
FIG. 2 Cross-sectional views schematically showing the hearth and its nearby portion of a rotary hearth furnace.
Figure 2:
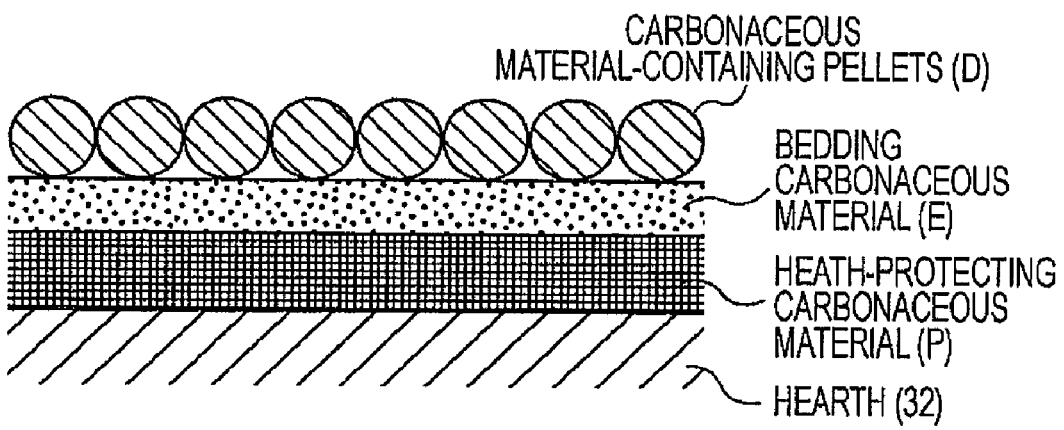

Next, as schematically shown in FIG. 2(a), for example, coal as a bedding carbonaceous material E is charged on a hearth 32 of the rotary hearth furnace 14 to a predetermined thickness, and the carbonaceous charging pellets D are placed on the bedding carbonaceous material E to a thickness of 2 layers or less.

Means for quantitatively dispensing the bedding carbonaceous material E from, an intermediate hopper disposed above the rotary hearth furnace 14, supplying the dispensed bedding carbonaceous material E onto the hearth 32 through a feed pipe, and dispersing the supplied bedding carbonaceous material E in the width direction of the hearth 32 with a dispersion screw can be employed as the means for charging the bedding carbonaceous material E on the hearth 32 (bedding charging means), for example. Means including an intermediate hopper, a feed pipe, and a dispersion screw having the same structure as the bedding charging means and being provided at a downstream side of the bedding charging means in the hearth 32 moving direction may be used as the means for placing the carbonaceous charging pellets D on the bedding carbonaceous material E (raw material charging means).

The thickness of the bedding carbonaceous material E charged on the hearth 32 is preferably 1 to 10 mm. At less than 1 mm, the thickness of the bedding carbonaceous material E is too small and this renders it difficult to ensure that the entire surface of the hearth 32 is covered. In addition, the effect of preventing reoxidation may become insufficient. In contrast, at a thickness exceeding 10 mm, the effect of heating the carbonaceous charging pellets D from below via the surface of the hearth 32 may be reduced. In addition, the amount of carbonaceous material charged into the iron bath-type melting furnace 16 may become excessively large and there is an increasing risk that the fuel consumption rate would rise. A more preferable thickness of the bedding carbonaceous material E is 2 to 5 mm.

The average particle diameter of the bedding carbonaceous material E is 1 to 5 mm. At a diameter less than 1 mm, scattering is likely to occur during charging into the rotary hearth furnace 14 and the iron bath-type melting furnace 16, resulting in a decrease in carbonaceous material yield. In contrast, at a diameter exceeding 5 mm, the diameter approaches the preferable thickness upper limit of the bedding carbonaceous material E described above, rendering it difficult to lay the bedding carbonaceous material E at a uniform thickness. In addition, since gaps between the carbonaceous material particles widen and the carbonaceous charging pellets D become caught in the gaps, it becomes difficult to uniformly spread the carbonaceous charging pellets D on the layer of the bedding carbonaceous material E, thereby increasing the risk of a decrease in production efficiency and/or metallization ratio. A more preferable particle diameter of the bedding carbonaceous material E is 2 to 4 mm.

It should be noted that, the coal b after crushing may be sieved at a particular diameter (e.g., a 1-mm sieve) so that the minus sieve is used as the powdery carbonaceous reductant B and the plus sieve is used as the bedding carbonaceous material E.

The bedding carbonaceous material E preferably satisfies log MF$\leq$2 where MF is the Gieseler maximum fluidity. This is because a carbonaceous material having log MF exceeding 2 undergoes excessive softening and melting of carbonaceous material particles when heated in the rotary hearth furnace 14 and is likely to form deposits on the hearth 32. The bedding carbonaceous material E more preferably satisfies log MF$\leq$1 where MF is the Gieseler maximum fluidity.

The bedding carbonaceous material E preferably has a volatile content of 10 mass % or more on a dry basis. This is because coal, such as anthracite coal, having a low volatile content has a dense structure and high apparent density and thus easily undergoes bursting and powderization.

The bedding carbonaceous material E has a volatile content of preferably 50 mass % or less and more preferably 40 mass % or less on a dry basis. The volatile matter in the bedding carbonaceous material E is substantially completely devolatilized under heating in the rotary hearth furnace 14 and can be used as fuel gas in the rotary hearth furnace 14. However, if the volatile content is excessively large, more than a required amount of combustible gas is generated from the bedding carbonaceous material at the initial stage of reduction in the rotary hearth furnace 14, and unconsumed combustion gas remaining in the discharge gas of the rotary hearth furnace 14 is discharged, thereby decreasing the energy efficiency. Moreover, when the volatile content is excessively large, devolatilization of the volatile matter by heating reduces the weight of the carbonaceous material, and the carbonaceous material easily scatters during discharging from the rotary hearth furnace 14, thereby decreasing the carbonaceous material yield. Furthermore, although it is preferable to dry the bedding carbonaceous material E before being charged into the rotary hearth furnace 14, a carbonaceous material, such as brown coal, having a volatile content of about 50 mass % or more becomes porous by drying and thus easily combustible, and handling thereof becomes difficult.

Note that the bedding carbonaceous material having the above-described preferable volatile content need not be a single brand, and an adequate mixture of two or more brands with different volatile contents may be used. A carbonaceous material, such as coke powder or petroleum coke, which has already been heated in a separate process may be used as the carbonaceous material to be mixed.

(2) Reducing Step (Step of Generating Char)

The carbonaceous charging pellets D and the bedding carbonaceous material E layered on the hearth 32 as such are passed through the rotary hearth furnace 14 heated to an atmospheric temperature of 1100° C. to 1450° C. and preferably 1250° C. to 1450° C. in a residence time of 6 minutes or more. This is because the carbonaceous charging pellets D having a particular diameter may not be sufficiently reduced in a residence time of less than 6 min.

As the means for heating the carbonaceous charging pellets D and the bedding carbonaceous material E (heating means), for example, a plurality of burners (not shown) disposed above the side wall of the rotary hearth furnace 14 may be used.

In this manner, the carbonaceous charging pellets D are heated in the rotary hearth furnace 14 and the iron oxides in the carbonaceous charging pellets D are metalized by reduction with the carbonaceous reductant and form solid reduced iron F. The metallization ratio of the resultant solid reduced iron F is preferably 92% or more, and the carbon content is preferably 10 mass % or less and more preferably 5 mass % or less. Meanwhile, as the bedding carbonaceous material E is heated in the rotary hearth furnace 14, the volatile matter is devolatilized (carbonized) into char G. The devolatilized volatile matter is burnt in the rotary hearth furnace 14 to be effectively used as a fuel.

At an atmospheric temperature of 1350° C. or more, the carbonaceous charging pellets D after completion of reduction become molten on the hearth 32, and separation of the iron component and the slag components occurs. Since the pellets in a molten state are difficult to discharge from the rotary hearth furnace 14, the molten pellets are solidified by cooling in the rotary hearth furnace 14 and then discharged. In such a case, the solid reduced iron F is a mixture of iron nuggets and solid slag. However, it is not preferable from the viewpoints of productivity of the whole process and energy efficiency to re-melt in the iron bath-type melting furnace 16 the material that had been melted and solidified by cooling in the rotary hearth furnace 14. Thus, in order to further improve the productivity of the whole process and the energy efficiency, it is preferable to adjust the atmospheric temperature during reduction in the rotary hearth furnace 14 to 1350° C. or more to increase the productivity of the rotary hearth furnace 14 while discharging the carbonaceous charging pellets D from the rotary hearth furnace 14 before they melt on the hearth so that they can be melted in the iron bath-type melting furnace 16.

In order to prevent the molten iron and molten slag from damaging the hearth refractory in case the carbonaceous charging pellets D melt on the hearth 32, it is effective to form between the hearth 32 and the bedding carbonaceous material E a layer of a hearth protecting carbonaceous material P containing fine particles of a carbonaceous material that prevents penetration of the molten matter, as shown in FIG. 2(b).

The reasons for setting the metallization ratio of the solid reduced iron F to 92% or more and the carbon content to preferably 10 mass % or less and more preferably 5 mass % or less are as follows.

Figure 3:
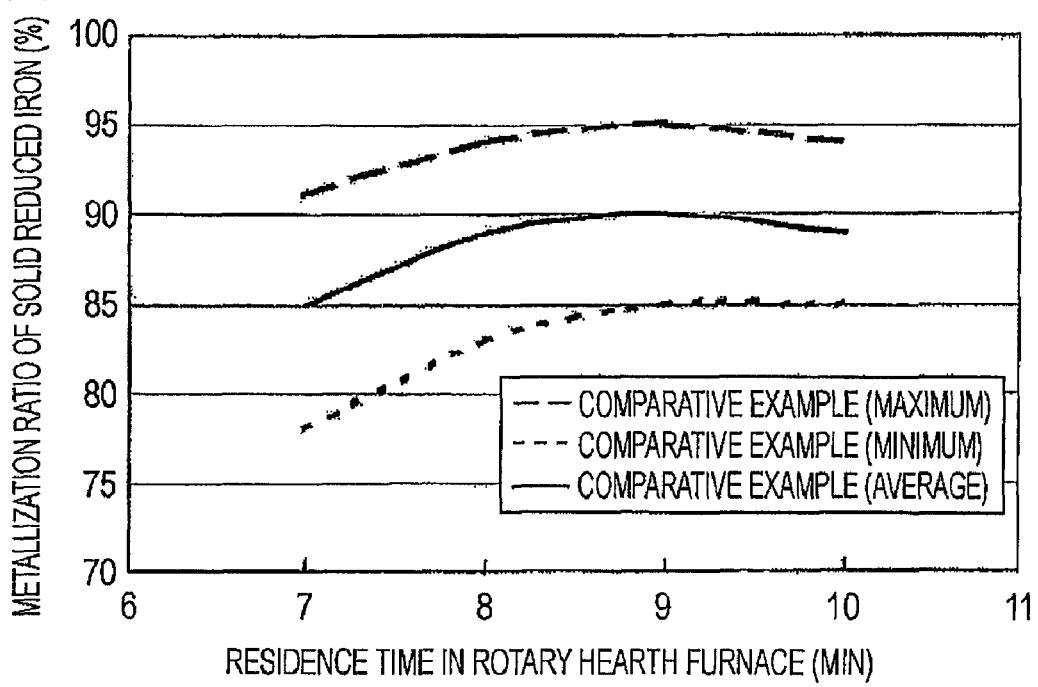
FIG. 3 Graphs showing the relationship between the metallization ratio of solid reduced iron and the residence time of a bedding carbonaceous material in the rotary hearth furnace, in which (a) is an example in which no bedding carbonaceous material is used and (b) is an example in which a bedding carbonaceous material is used.
Figure 3:
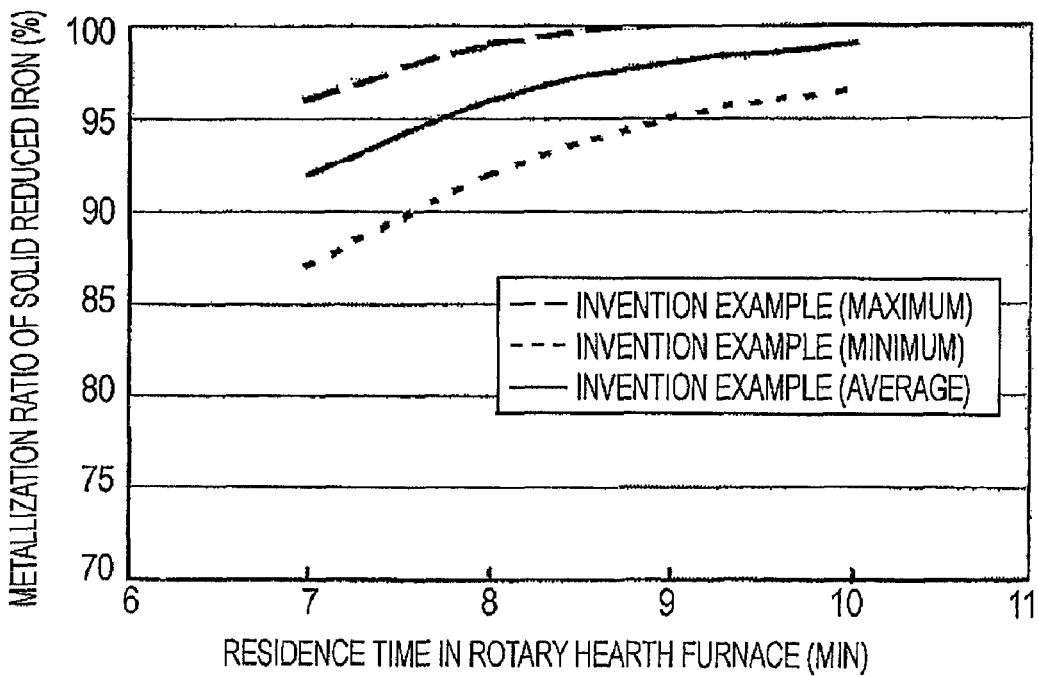

First, the reason for setting the metallization ratio to 92% or more is described. That is, as the metallization ratio of the solid reduced iron F increases, the amount of carbon required for metalizing the iron oxides (FeO and the like) remaining in the solid reduced iron F in the iron bath-type melting furnace 16 decreases. This reduces the consumption of the carbonaceous material in the iron bath-type melting furnace 16 as a whole. Accordingly, the metallization ratio is preferably as high as possible. However, when carbonaceous charging pellets are reduced in a rotary hearth furnace without using a bedding carbonaceous material, the resulting solid reduced iron becomes reoxidized by an oxidizing atmosphere inside the rotary hearth furnace. Thus, as shown in FIG. 3(a), it has been extremely difficult to stably achieve a metallization ratio of 90% or more even by using carbonaceous charging pellets having a pellet size (diameter) of 17 mm. In contrast, in the case where the bedding carbonaceous material E is used, the char G produced from the bedding carbonaceous material E modifies the oxidizing gas components $CO_2$ and $H_2O$ in the oxidizing atmosphere into reducing gas components through reactions, $CO_2+C \rightarrow 2CO$ and $H_2O+C \rightarrow H_2+CO$, thereby suppressing or preventing the reoxidation of the solid reduced iron F. As a result, as shown in FIG. 3(b), a metallization ratio of 92% or more can be easily achieved even when the carbonaceous charging pellets of the same pellet size are used. Depending on the operation conditions, a metallization ratio of 94% or more is even achievable. Thus, the metallization ratio of the solid reduced iron F is set to 92% or more. More preferably, the metallization ratio of the solid reduced iron F is 94% or more. Note that in FIG. 3, the composition of the carbonaceous charging pellets is 71.9 mass % $Fe_2O_3$, 18.0 mass % C, 2.7 mass % $SiO_2$, and 1.7 mass % CaO, and the thickness of the bedding carbonaceous material is 2 mm.

Figure 4:
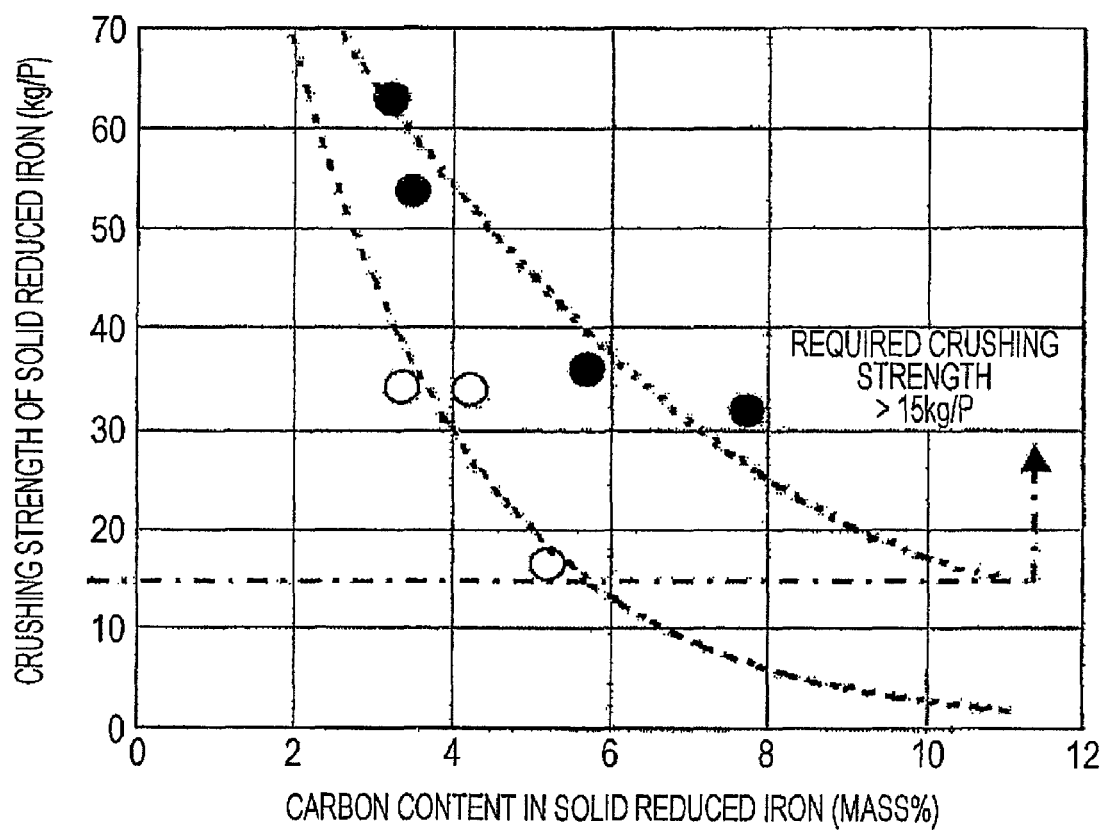
FIG. 4 A graph showing the relationship between the carbon content and the crushing strength of the solid reduced iron.

Next, the reason for setting the carbon content to preferably 10 mass % or less and more preferably 5 mass % or less is described. That is, from the viewpoint of the consumption of the carbonaceous material in the iron bath-type melting furnace 16, the carbon content is preferably as high as possible. This is because as the carbon content in the solid reduced iron F increases, not only the amount of carbon required to metalize iron oxides (FeO and the like) remaining in the solid reduced iron F can be supplied in the iron bath-type melting furnace 16, but also the rest of carbon is used for carburizing the molten iron produced by melting the solid reduced iron. However, as shown in FIG. 4, irrespective of whether a carbonaceous material with high fluidity (indicated by closed circles in FIG. 4) or a carbonaceous material with low fluidity (indicated by open circles in FIG. 4) is used, the crushing strength of the solid reduced iron F decreases as the carbon content (residual carbon content) increases, thereby leading to easier powdering at the time of discharging the solid reduced iron from the rotary hearth furnace 14 or charging the solid reduced iron into an iron bath-type melting furnace. Since the dust loss increases as a result, the carbon content is preferably as low as possible from the iron yield and carbon yield viewpoints. Therefore, the upper limit of the carbon content in the solid reduced iron F is set in the range as high as possible but without excessively decreasing the crushing strength, i.e., preferably 10 mass % or less and more preferably 5 mass % or less. The preferable lower limit of the carbon content in the solid reduced iron F is about 1.5 mass %, which is required for metalizing iron oxides (FeO and the like) remaining in the solid reduced iron F, in the case where the metallization ratio is 92%. In FIG. 4, the crushing strength is indicated in terms of a load (kg/P) per piece of solid reduced iron.

The carbon content can be increased to about 10 mass % while maintaining the strength of the solid reduced iron F by using coal having fluidity as the powdery carbonaceous reductant B contained in the carbonaceous charging pellets D. However, since coal having fluidity is a limited source and generally expensive, it is preferable from the manufacturing cost viewpoint to employ a process that uses coal having no fluidity and limits the carbon content in the solid reduced iron F to 5 mass % or less.

Such metallization ratio and carbon content of the solid reduced iron F can be achieved by adequately controlling the mixing ratio of the iron ore (iron oxide source) a and the coal (carbonaceous reductant) b in the carbonaceous charging pellets D, the thickness and average particle size of the bedding carbonaceous material E, the atmospheric temperature of the rotary hearth furnace 14, the residence time of the carbonaceous charging pellets D in the rotary hearth furnace 14, etc.

(3) Melting Furnace Charging Step (Step of Charging Solid Reduced Iron and Char into Melting Furnace)

The solid reduced iron F and the char G thus obtained are discharged from the rotary hearth furnace 14 and are continuously charged into the iron bath-type melting furnace 16 while they are still hot (in a heated, hot state), i.e., without substantially cooling them by following means (melting furnace charging means), for example.

In particular, by providing a feed pipe extending from the outlet of the rotary hearth furnace 14 to the iron bath-type melting furnace 16 thereunder, the solid reduced iron F and the char G can be together discharged by a discharge screw provided at the outlet of the rotary hearth furnace 14, although this is not shown in the drawing, and the solid reduced iron F and the char G drop through the feed pipe and be charged into the iron bath-type melting furnace 16 by their own weight. The solid reduced iron F and the char G are preferably charged by avoiding contact with the inner wall surface of the iron bath-type melting furnace 16.

Another carbonaceous material (hereinafter referred to as "additional carbonaceous material") H, which is added when the secondary material I as a slag-forming agent, carbon in the solid reduced iron F, and the char G are not enough to cover the required amount of carbonaceous material to be consumed in the iron bath-type melting furnace 16, and the like (hereinafter referred to as "secondary material and other charges") are added to the iron bath-type melting furnace 16 through a system separate from the solid reduced iron F and the char G. Note that the solid reduced iron F, the char G, the secondary material, and other charges are preferably charged while avoiding contact with the inner wall surface of the iron bath-type melting furnace 16 since they adhere or deposit on the inner wall surface of the melting furnace 16 upon contact.

The solid sensible heat can be efficiently recovered and the consumption of the carbonaceous material in the iron bath-type melting furnace 16 can be reduced by charging the solid reduced iron F and the char G while they are still hot (in a heated, hot state), i.e., without substantially cooling them.

Here, the temperature at which the solid reduced iron F and the char G are charged into the iron bath-type melting furnace 16 without substantial cooling is defined as a temperature at which the solid reduced iron F and the char G discharged from a hopper 106 can be charged into the iron bath-type melting furnace 16 without applying thermal load on the furnace interior. A specific charging temperature is 500° C. to 1100° C.

The temperature of the solid reduced iron F and the char G at the time of charging into the iron bath-type melting furnace 16 is preferably 500° C. to 1100° C. from the following points also. That is, at a temperature less than 500° C., the effect of recovering the solid sensible heat is small, and at a temperature exceeding 1100° C., the heat resistance of the discharge screw or the like becomes problem, and the operation troubles are likely to occur.

In this embodiment, the average particle diameter of the bedding carbonaceous material E is limited to 1 mm or more (but 5 mm or less) so that even when the char G, i.e., the carbonized bedding carbonaceous material E, is continuously dropped into the iron bath-type melting furnace 16, scattering can be sufficiently suppressed. Note that the bedding carbonaceous material E is preferably selected so that, as described above, powdering, melting, bulging, and the like are minimized even when they are heated and carbonized in the rotary hearth furnace 14. Accordingly, although the apparent specific gravity is decreased by carbonization, the change in particle diameter is negligible and thus the particle size distribution and average particle diameter of the char G can be assumed to be substantially the same as those of the bedding carbonaceous material E.

Figure 7:
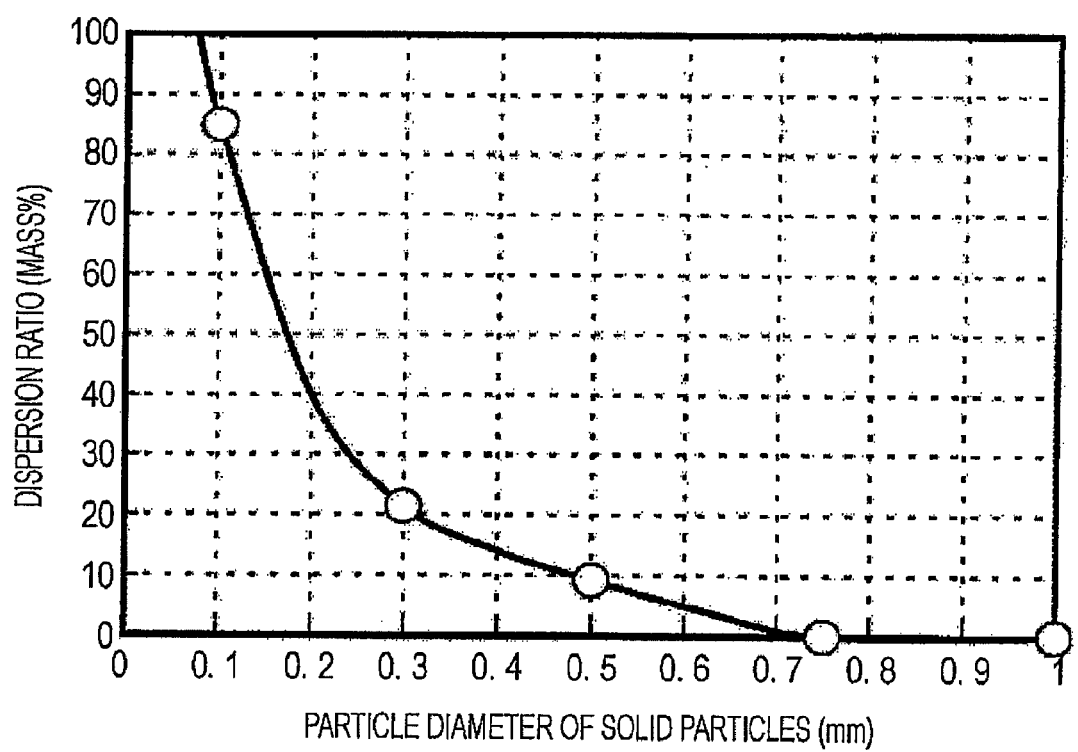
FIG. 7 A graph showing the relationship between the particle diameter and the dispersion ratio of the solid particles.

Although details are described below in Examples, as shown in FIG. 7, scattering (dispersion into discharge gas) caused by the gas generated from the iron bath-type melting furnace 16 does not occur when the particle size of the char G is 0.75 mm or more, and scattering at last starts to occur at a particle size of less than 0.75 mm. Thus, when a bedding carbonaceous material E having an average particle size of 1 mm or more in which the ratio of easily scatterable particles having a particle size of less than 0.75 mm is sufficiently small is used, only part of the particles having a particle size of less than 0.75 mm is scattered in continuously dropping the char G into the iron bath melting furnace G. Thus, the ratio (dispersion ratio) of the total mass of the particles scattered to the entire mass of the char G can be sufficiently reduced. In the case where the carbon content in the solid reduced iron F and the char G are not enough to cover the amount of carbonaceous material required in the iron bath-type melting furnace, the additional carbonaceous material H can be additionally charged into the iron bath-type melting furnace 16, as described above.

The average volatile content of all carbonaceous materials (however, carbon contained in the solid reduced iron F is excluded) charged into the iron bath-type melting furnace 16 is preferably 15 mass % or less on a dry basis. In the cases where the additional carbonaceous material H is charged, the type of carbonaceous material is preferably selected so that the volatile content in the additional carbonaceous material H is such a level that the weighted average volatile content of the volatile content of the additional carbonaceous material H and the volatile content of the char G (usually about 0 mass %) is 15 mass % or less on a dry basis. When the average volatile content exceeds 15 mass %, the volatile matter burns inside the iron bath-type melting furnace 16, thereby excessively increasing the vapor phase-side temperature and increasing the risk of refractory damage.

(4) Melting Step (Step of Generating Molten Iron)

Oxygen gas J as oxygen-containing gas is blown into the iron bath-type melting furnace 16 through a plurality of lances as oxygen blowing means to burn the carbonaceous materials (char G and the additional carbonaceous material H), melt the solid reduced iron F, and separate slag L. Molten iron K is obtained as a result. The iron bath-type melting furnace 16 may be of a tilting type or a fixed type.

The amount of oxygen blown in from some (one or more) lances, among the plurality of lances, disposed near the position from which the solid reduced iron F and the char G are charged is preferably smaller than that blown in from other lances. In this manner, the amount of gas generated from a molten bath near the position from which the solid reduced iron F and the char G are charged is significantly reduced locally. Thus, the amount of scattered char G can be further reduced.

Figure 5:
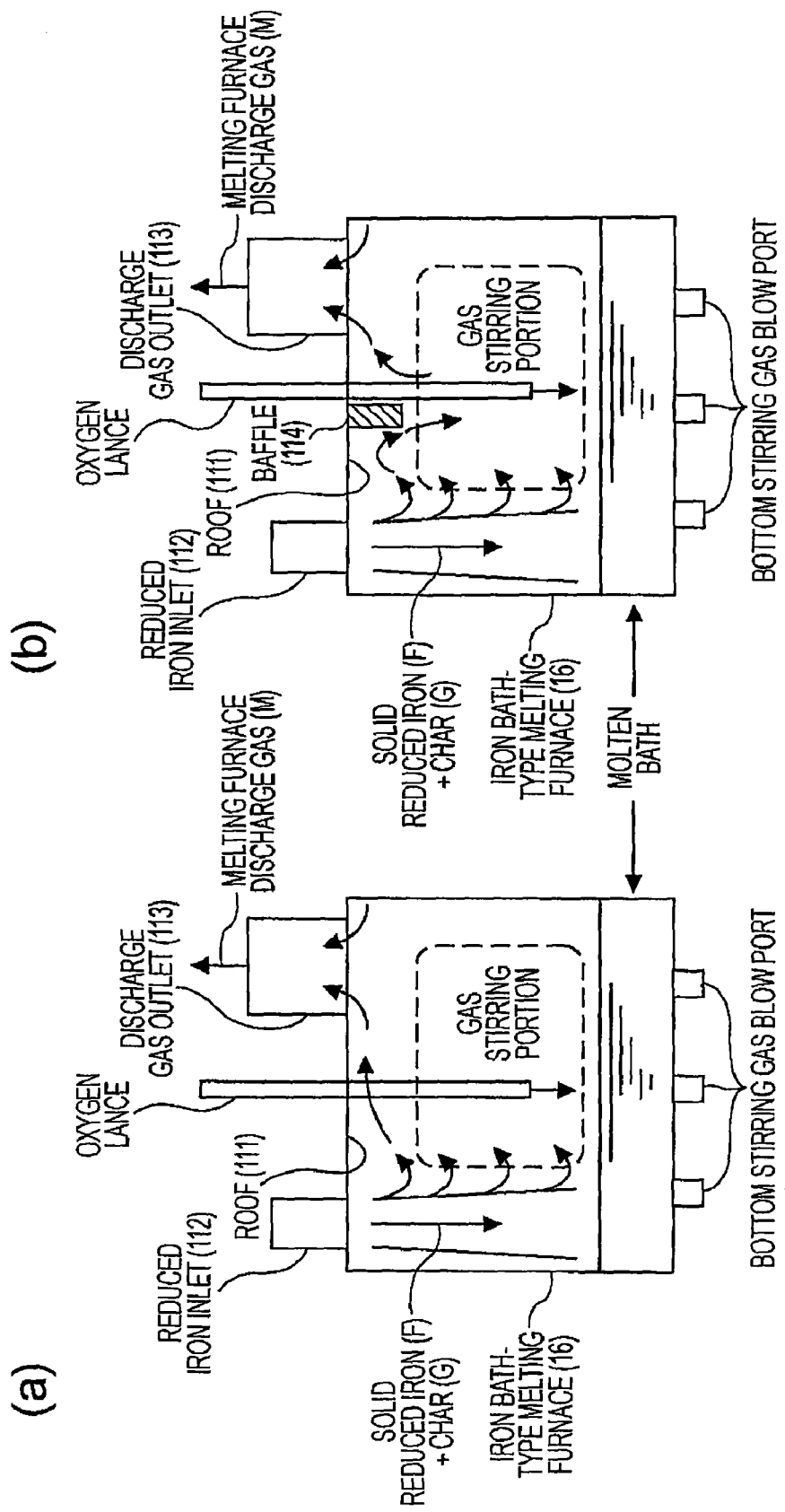
FIG. 5 Cross-sectional views illustrating gas streams in iron bath-type melting furnaces of the present invention, in which (a) shows a basic structure and (b) shows an example with a baffle.

As shown in FIG. 5(b), a baffle 114 is preferably provided at a roof 111 of the iron bath-type melting furnace 16 and between a reduced iron inlet 112 from which the solid reduced iron F and the char G are charged and a discharge gas outlet 113 from which the discharge gas (melting furnace discharge gas) M of the iron bath-type melting furnace 16 is discharged. In the cases where no baffle 114 is provided, as shown in FIG. 5(a), the char G is easily discharged together with the melting furnace discharge gas M by a gas stream short-cutting from the reduced iron inlet 112 to the discharge gas outlet 113 along the roof 111. In contrast, in the cases where the baffle 114 is formed, as shown in FIG. 5(b), the gas stream from the reduced iron inlet 112 along the roof 111 is turned into a downward stream by the baffle 114, and the char G carried with the gas stream easily reaches the molten bath surface with the downward stream, thereby effectively suppressing dispersion into the melting furnace discharge gas M. Note that in FIGS. 5(a) and (b), arrows indicate the gas stream.

In this melting step, melting is preferably conducted at a secondary combustion ratio of 40% or less. This is because at a secondary combustion ratio exceeding 40%, the effect of carbonaceous material consumption reduction is rarely exhibited at a metallization ratio of the solid reduced iron F of 92% or more. In addition, the load on the iron bath-type melting furnace 16 would increase, e.g., the vapor phase-side temperature of the iron bath-type melting furnace 16 would rise excessively to cause damage on the refractory. A preferable range of the secondary combustion ratio is 10% to 35% at which the carbonaceous material consumption is sufficiently low, and a more preferable range is 15% to 30% at which the load on the iron bath-type melting furnace 16 is further reduced.

(5) Melting Furnace Discharge Gas Circulating Step

Since the melting furnace discharge gas M contains high concentrations of CO and $H_2$ components, the melting furnace exhaust gas M after cooling and subjecting to dust removal with a gas cooling/dust removal apparatus 24 is preferably at least partly sent to the rotary hearth furnace 14 to be used as the fuel gas of the rotary hearth furnace 14. If necessary, an external fuel N may be added.

As described above, according to the present invention, since the average particle size of the easily scatterable char G (bedding carbonaceous material E) is limited to 1 mm or more (but 5 mm or less), the amount of carbonaceous materials dispersed into the discharge gas M can be significantly reduced and the yield of the carbonaceous materials in the whole process can be improved. Since the bedding carbonaceous material E is used, the hearth 32 is further securely protected, troubles such as hearth separation can be avoided, and the rotary hearth furnace 14 can be continuously operated over a longer period. The volatile matter devolatilized by heating the bedding carbonaceous material E in the rotary hearth furnace 14 is effectively used as fuel gas for the rotary hearth furnace together with at least part of discharge gas of the iron bath-type melting furnace 16, thereby decreasing the fuel consumption of the rotary hearth furnace 14. Since the char G after devolatilization is free of volatile matter, damage on refractories caused by burning of the volatile matter in the iron bath-type melting furnace 16 can be prevented and the lifetime of the refractories of the iron bath-type melting furnace 16 can be extended. Since the bedding carbonaceous material E is used, reoxidation of the solid reduced iron F in the rotary hearth furnace 14 is prevented, a metallization ratio as high as 92% or more is achieved, and the carbonaceous material consumption in the iron bath-type melting furnace 16 can be significantly reduced. Moreover, the whole process including reduction and melting can be designed to be an energetically self-contained process by adjusting the metallization ratio of the solid reduced iron F and the volatile content and the amount of the bedding carbonaceous material E used and adjusting the total calorific value of the discharge gas generated from the iron bath-type melting furnace 16 to be equal to the necessary and sufficient calorific value of the rotary hearth furnace 14.

Second Embodiment

In the first embodiment described above, the average particle diameter of the bedding carbonaceous material E is limited to 1 mm or more (but 5 mm or less) to adjust the average particle diameter of the char G to 1 mm or more and prevent scattering of the char G in the iron bath-type melting furnace 16. Alternatively, the following step may be employed.

That is, instead of particularly limiting the lower limit of the average particle size of the bedding carbonaceous material E, a vibrating sieve (not shown in the drawing), which is classifying means, may be provided between the rotary hearth furnace 14 and the iron bath-type melting furnace 16 so that the solid reduced iron F and the char discharged from the rotary hearth furnace 14 are classified into a coarse particle portion having an average size of 1 mm or more and the rest, i.e., a fine particle portion, by using the vibrating sieve while the solid reduced iron F and the char G are still hot (without substantial cooling) and so that only the coarse particle portion is continuously dropped into the iron bath-type melting furnace 16. Note that since the fine particle portion can be circulated into the mixer 8, for example, and reused as part of the powdery carbonaceous reductant B, the fine particle portion can be effectively used without decreasing the carbonaceous material yield of the process as a whole.

Third Embodiment

Alternatively, the following step may be employed to prevent scattering of the char G in the iron bath-type melting furnace 16.

That is, instead of particularly limiting the lower limit of the average particle size of the bedding carbonaceous material E, a briquetting machine (not shown), which is agglomerating means, may be provided between the rotary hearth furnace 14 and the iron bath-type melting furnace 16 so that the solid reduced iron F and the char G, the lower limit of the average particle size of which is not particularly limited, are hot-formed with the briquetting machine while the solid reduced iron F and the char G discharged from the rotary hearth furnace 14 are still hot (without substantial cooling) and so that the formed briquettes are continuously dropped into the iron bath-type melting furnace 16.

Here, a technique of producing hot briquette iron (HBI) by hot-forming of solid reduced iron discharged from a conventional gas-base reducing furnace by using a briquetting machine is publicly known. However, if the temperature of the solid reduced iron is excessively high, the solid reduced iron adheres onto the rollers of the briquetting machine, resulting in more frequent occurrence of troubles. Thus, the temperature of the solid reduced iron is limited to about 850° C. at maximum. On the other hand, the temperature of the solid reduced iron F discharged from the rotary hearth furnace 14 is as high as about 1000° C. to 1100° C.; thus, in the cases where no bedding carbonaceous material E is used, the solid reduced iron F discharged from the rotary hearth furnace 14 must be cooled to at least about 850° C. before hot forming, and the sensible heat of the solid reduced iron F has not been fully utilized. In contrast, in this process of using the bedding carbonaceous material E, since the solid reduced iron F is hot-formed along with the char G, the powdery char G acts as a releasing agent. Thus, the solid reduced iron F is prevented from adhering onto the rollers even when the temperature is higher (e.g., about 950° C.). As a result, the solid reduced iron F can be hot-formed together with the char G without substantially cooling, the resulting agglomerates at a higher temperature can be continuously charged into the iron bath-type melting furnace 16, and the sensible heat of the solid reduced iron F can be effectively utilized. Of course, since the char G is agglomerated together with the solid reduced iron F and charged into the iron bath-type melting furnace 16, scattering of the char can be further securely prevented. The apparent density of the agglomerate particles is 3 to 5 g/cm$^3$, which is sufficiently larger than the apparent density (0.7 to 1.5 g/cm$^3$) of the char G particles.

[Modifications]

In the first embodiment, an example in which the secondary material and other charges are added to the iron bath-type melting furnace though a system different from the solid reduced iron and the char is described. Alternatively, the secondary material and other charge may be charged through the same system.

Figure 6:
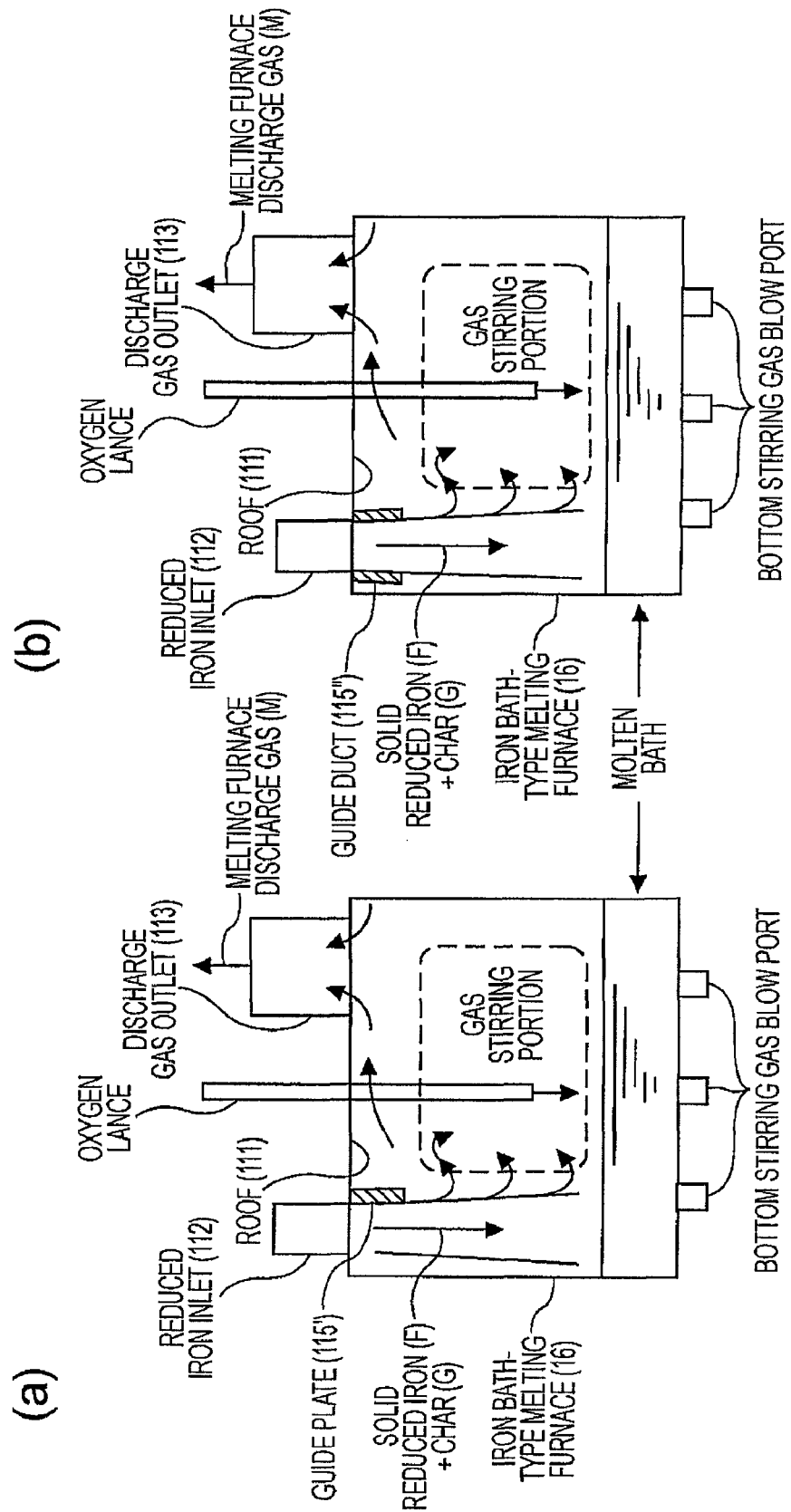
FIG. 6 Cross-sectional views illustrating gas streams in iron bath-type melting furnaces of the present invention, in which (a) shows an example of installing a guide plate and (b) shows an example of installing a guide duct.

Moreover, an example of providing a baffle at the roof of the iron bath-type melting furnace is described. Alternatively, instead of or in addition to the baffle, guiding means 115 such as a guide plate 115' or a guide duct 115" may be provided at the reduced iron inlet 112, as shown in FIGS. 6(a) and (b). The guiding means 115 secures the downward solid stream in the iron bath-type melting furnace 16 and promotes the char G to reach the surface of the molten bath. Thus, the char G is prevented from being trapped in the gas stream along the roof 111 and discharged together with the melting furnace discharge gas M. In FIGS. 6(a) and (b), arrows indicate the gas stream.

Although iron ore is described as an example of the iron oxide source, iron oxide-containing blast furnace dust, mill scale, and the like may be used in addition. Furthermore, materials, such as dust or slag discharged from a metal refinery, that contains iron oxides, nonferrous metals, and oxides of nonferrous metals may also be used.

Although coal is described as the example of the carbonaceous reductant, the bedding carbonaceous material, and the additional carbonaceous material, coke, oil coke, charcoal, wood chips, waste plastics, old tires, and the like may also be used.

The carbonaceous charging pellets formed with a pelletizer are described as an example of the carbonaceous material-containing agglomerates. Instead of the carbonaceous charging pellets, carbonaceous charging briquettes formed by compaction with a pressure molding machine may be used. In such a case, instead of adding water during molding, dry material may be used depending on the type of binder. Since the strength of the carbonaceous charging briquettes is increased and the explosion during heating can be suppressed by increasing the pressurizing power of the pressure molding machine, a carbonaceous material having a volatile content of 30 mass % or more can be used as the charging carbonaceous material.

The combination of a feed pipe and a dispersion screw is described as means for supplying the bedding carbonaceous material on the hearth. Alternatively, a vibrating feeder may be used to spread the bedding carbonaceous material on the hearth.

Oxygen gas is described as an example of the oxygen-containing gas. Alternatively, a high-temperature air or oxygen-enriched high-temperature air may be used.

A rotary hearty furnace is described as an example of a moving hearth reducing furnace. Alternatively, a straight-line furnace may be used.

An example of burning a carbonaceous material as the energy source of the iron bath-type melting furnace with oxygen-containing gas is described. Electrical energy may be used in addition.

In the second embodiment, a vibrating sieve is described as an example of classifying means. Alternatively, a fixed-type grizzly, a water-cooled roller screen, an air classifier, or the like may be used.

In the third example, a briquetting machine is described as an example of the agglomerating means. Alternatively, a compacting machine or the like may be used.

EXAMPLES

No. 1: Relationship Between Particle Diameter of Solid Particles and Dispersion Ratio First, in order to clarify the relationship between the particle diameter of the solid particles (solid reduced iron and char) and the dispersion ratio, a mathematical model simulating an iron bath-type melting furnace free of a baffle and guiding means was prepared as shown in FIG. 5(a), and the amount of solid particles dispersed in the discharge gas was estimated by simulation calculation.

(Calculation Conditions)

Size of molten bath-type melting furnace: inner diameter: 2.0 m (constant in the height direction), free board height: 2.0 m Inner diameter of reduced iron inlet: 0.4 m Inner diameter of discharge gas outlet: 0.8 m Apparent density of solid particles: 1.4 g/cm$^3$ (refer to footnote below)

Particle diameter of solid particles: single particle diameter in the range of 0.1 to 1.0 mm (refer to footnote below)

Amount of solid particles charged: 300 kg/h (continuous charging)

Amount of oxygen blown in: 800 Nm$^3$/h

Amount of melting furnace discharge gas: 1700 Nm$^3$/h

Temperature of melting furnace discharge gas: 1650° C.

The amount of gas generated from the molten bath surface was assumed to be constant per unit cross section.
(Footnote) The dispersion ratio of the solid particles changes with the apparent density and the particle diameter. In this simulation calculation, the apparent density of the solid particles was set to 1.4 g/cm$^3$ and the particle diameter was set to a single diameter within the range of 0.1 to 1.0 mm.

It should be noted that since the solid reduced iron and the char were to be charged together, the apparent density of the solid particles was set by assuming that the mass ratio of the solid reduced iron to the char constituting the solid particles was about 90:10 to 80:20, that the apparent density of the solid reduced iron was 2 to 3 g/cm$^3$, and that the apparent density of the char was about 1.0 g/cm$^3$.
(Calculation Results)

The particle diameter of the solid particles was sequentially changed within the range of 0.1 to 1.0 mm to conduct simulation calculation. The calculation results are shown in FIG. 7. The graph shows that when the particle diameter is sequentially decreased from 1.0 mm, scattering (dispersion) of the solid particles does not occur and the dispersion ratio is 0% until 0.75 mm; however, as the particle diameter becomes smaller, scattering (dispersion) starts, and the dispersion ratio is 9.2% at a particle diameter of 0.5 mm and 21.4% at 0.3 mm, showing a gradual increase. However, the dispersion ratio rapidly increases to 85% at a particle diameter of 0.1 mm.

The dispersion ratio of the solid particles is the value of the ratio (percentage) of the mass of the solid particles dispersed in the melting furnace discharge gas to the total mass of the solid particles charged in the iron bath-type melting furnace.

No. 2: Dispersion Ratio of Solid Particles Having Particle Size Distribution

In the simulation calculation described above, the dispersion ratio was estimated for the solid particles having a single particle diameter. However, actual solid particles have a particle size distribution. Two-types of bedding carbonaceous materials having particle size distributions shown in Table 1 (invention example) and Table (comparative example) were used as the examples of the solid particles, and then the dispersion ratio of each bedding carbonaceous material was estimated by rough calculation on the basis of the simulation calculation results (FIG. 7) described above. In other words, in this example, the solid reduced iron was put out of consideration and the cases where only the bedding carbonaceous material was used as the solid particles charged into the iron bath-type melting furnace were contemplated. As in the simulation calculation described above, the apparent density of each bedding carbonaceous material was assumed to be 1.4 g/cm$^3$. As shown in Tables 1 and 2, a rough value of the dispersion ratio in each particle size range was determined from FIG. 7 by assuming a representative diameter of that particle size range in the graph to be the particle diameter of the solid particles, and then the dispersion ratio of the entire bedding carbonaceous material was calculated from the rough values of the dispersion ratios of these particle size ranges by weight-averaging the rough values with the mass ratios of the particle size ranges. Note that in Tables 1 and 2, symbol "+" indicated in the column of the particle size range means "equal to or more than", and symbol "−" means "less than". For example, "+0.106-0.3" indicates a particle size range of 0.106 mm or more but less than 0.3 mm; "−0.106" indicates a particle size range of less than 0.106 mm. The representative diameter is assumed as the arithmetic means of the upper and lower limit values of each particle size range. The representative diameter of the "particle size range of +9.5 mm" in Table 1 is assumed to be equal to the lower limit value (9.5 mm) of the range. The representative diameter of "particle size range of +0.70 mm" in Table 2 is assumed to be equal to the lower limit value (0.70 mm) of the range.

The average particle diameters shown in Tables 1 and 2 are determined by weight-averaging the values of the representative diameters of respective particle size ranges on the basis of the mass ratios of the particle size ranges.

TABLE 1

| Particle size range (mm) | Representative diameter (mm) | Ratio (mass %) | Dispersion ratio of each particle size range (mass %) |
|---|---|---|---|
| −0.106 | 0.053 | 5.59 | 100 |
| +0.106 −0.3 | 0.203 | 12.74 | 40 |
| +0.3 −0.5 | 0.4 | 10.46 | 14 |
| +0.5 −1.0 | 0.75 | 19.20 | 0 |
| +1.0 −2.0 | 1.5 | 23.84 | 0 |
| +2.0 −2.8 | 2.4 | 10.34 | 0 |
| +2.8 −3.35 | 3.075 | 5.42 | 0 |
| +3.35 −5.6 | 4.475 | 11.13 | 0 |
| +5.6 −6.7 | 6.15 | 1.01 | 0 |
| +6.7 −9.5 | 8.1 | 0.24 | 0 |
| +9.5 | 9.5 | 0.03 | 0 |
| Total | — | 100.00 | — |

| Average particle diameter (mm) | Dispersion ratio of entire bedding carbonaceous material (mass %) |
|---|---|
| 1.57 | 12.2 |

Note:
Representative diameter is the arithmetic means of the upper and lower limit values of each particle size range. However, for the particle size range of +9.5 mm, the representative diameter is assumed to be equal to the lower limit value.

TABLE 2

| Particle size range (mm) | Representative diameter (mm) | Ratio (mass %) | Dispersion ratio of each particle size range (mass %) |
|---|---|---|---|
| −0.122 | 0.061 | 23.1 | 100 |
| +0.122 −0.144 | 0.133 | 3.5 | 70 |
| +0.144 −0.239 | 0.1915 | 15.0 | 42 |
| +0.239 −0.340 | 0.2895 | 13.7 | 22 |
| +0.340 −0.408 | 0.374 | 6.8 | 15 |
| +0.408 −0.750 | 0.579 | 20.1 | 6 |
| +0.70 | 0.70 | 17.8 | 1 |
| Total | — | 100.0 | — |

| Average particle diameter (mm) | Dispersion ratio of entire bedding carbonaceous material (mass %) |
|---|---|
| 0.354 | 37.3 |

Note:
Representative diameter is the arithmetic means of the upper and lower limit values of each particle size range. However, for the particle size range of +0.70 mm, the representative diameter is assumed to be equal to the lower limit value.

(Calculation Results)

As shown in Table 2 (comparative example), in the case where a bedding carbonaceous material having an average particle diameter of 0.354 mm is charged into the iron bath melting furnace, the dispersion ratio is estimated to be 37.3%. In the case where a bedding carbonaceous material having an average particle diameter of less than 1 mm is used, the amount of dispersion into discharge gas from the iron bath-type melting furnace is significantly large. In contrast, as shown in Table 1 (invention example), in the case where a bedding carbonaceous material having an average particle diameter of 1.57 mm is charged into the iron bath melting furnace, the dispersion ratio is estimated to be 12.2%. Thus, it was confirmed that the amount of dispersion into the discharge gas from the iron bath-type melting furnace could be sufficiently suppressed by using a bedding carbonaceous material having an average particle size of 1 to 5 mm (more preferably 2 to 4 mm).

As described above, a molten iron production process according to one aspect of the present invention is a process for producing molten iron with a combination of a moving-hearth reducing furnace and an iron bath-type melting furnace, including a step of charging a bedding carbonaceous material having an average particle diameter of 1 to 5 mm on a hearth of the moving-hearth reducing furnace and placing carbonaceous material-containing agglomerates containing a powdery iron oxide source and a powdery carbonaceous reductant on the bedding carbonaceous material; a step of thermally reducing the carbonaceous material-containing agglomerates while moving the hearth in the moving-hearth reducing furnace to generate solid reduced iron and simultaneously thermally carbonizing the bedding carbonaceous material to generate char; a step of continuously charging the solid reduced iron and the char into the iron bath-type melting furnace from thereabove without substantial cooling; and a step of blowing oxygen-containing gas into the iron bath-type melting furnace to melt the solid reduced iron and to thereby generate molten iron.

A molten iron production process according to another aspect of the present invention is a process for producing molten iron with a combination of a moving-hearth reducing furnace and an iron bath-type melting furnace, including a step of charging a bedding carbonaceous material on a hearth of the moving-hearth reducing furnace and placing carbonaceous material-containing agglomerates containing a powdery iron oxide source and a powdery carbonaceous reductant on the bedding carbonaceous material; a step of thermally reducing the carbonaceous material-containing agglomerates while moving the hearth in the moving-hearth reducing furnace to generate solid reduced iron and simultaneously thermally carbonizing the bedding carbonaceous material to generate char; a step of classifying the solid reduced iron and the char into a coarse particle portion having an average particle diameter of 1 mm or more and the rest, a fine particle portion without substantial cooling; a step of continuously charging only the coarse particle portion into the iron bath-type melting furnace from thereabove; and a step of blowing oxygen-containing gas into the iron bath-type melting furnace to melt the solid reduced iron and to thereby generate molten iron.

A molten iron production process according to yet another aspect of the present invention is a process for producing molten iron with a combination of a moving-hearth reducing furnace and an iron bath-type melting furnace, including a step of charging a bedding carbonaceous material on a hearth of the moving-hearth reducing furnace and placing carbonaceous material-containing agglomerates containing a powdery iron oxide source and a powdery carbonaceous reductant on the bedding carbonaceous material; a step of thermally reducing the carbonaceous material-containing agglomerates while moving the hearth in the moving-hearth reducing furnace to generate solid reduced iron and simultaneously thermally carbonizing the bedding carbonaceous material to generate char; a step of hot-forming the solid reduced iron and the char into agglomerates without substantial cooling; a step of continuously charging the agglomerates into the iron bath-type melting furnace from thereabove; and a step of blowing oxygen-containing gas into the iron bath-type melting furnace to melt the solid reduced iron and to thereby generate molten iron.

According to the molten iron production processes of the present invention described above, the amount of carbonaceous materials dispersing into discharge gas of the iron bath melting furnace can be significantly reduced and the carbonaceous material yield of the whole process can be improved even when the carbonaceous materials are continuously charged into the iron bath melting furnace from above because (1) a bedding carbonaceous material of a predetermined size is charged on a hearth of the moving-hearth reducing furnace to control the average particle diameter of easily scatterable char, (2) the easily scatterable char is classified to isolate only a coarse particle portion, or (3) the easily scatterable char is agglomerated together with solid reduced iron.

Furthermore, use of the bedding carbonaceous material further securely protects the hearth to avoid troubles such as hearth separation, and continuous operation of the moving hearth reducing furnace is achieved over a longer period.

The volatile matter devolatilized as the bedding carbonaceous material is heated in the moving-hearth reducing furnace is effectively used as the fuel for the moving-hearth reducing furnace along with at least part of discharge gas of the iron bath-type melting furnace. Thus, the fuel consumption of the moving-hearth reducing furnace can be reduced.

Since the char after devolatilization is free of volatile matter, refractory damage caused by burning of the volatile matter in the iron bath-type melting furnace is prevented, and the lifetime of the refractory of the iron bath-type melting furnace is extended.

Use of the bedding carbonaceous material prevents reoxidation of the solid reduced iron in the moving-hearth reducing furnace to achieve a high metallization ratio and significantly decreases the carbonaceous material consumption in the iron bath-type melting furnace.

Operation of the moving-hearth reduction furnace and the iron bath-type melting furnace can be further stabilized and reduction of fuel consumption rate can be further securely achieved by the synergy of the above-described effects.

In the molten iron production methods of the present invention, in the step of generating molten steel, the oxygen-containing gas may be blown in from a plurality of lances, and the amount of gas blown in from some of the lances may be smaller than that from the rest of the lances. In this manner, the amount of gas generated from a molten bath near the position from which the solid reduced iron and the char are charged is significantly reduced locally. Thus, the amount of scattered char can be further reduced.

A molten steel production apparatus of still another aspect of the present invention is an apparatus for producing molten iron with a combination of a moving-hearth reducing furnace and an iron bath-type melting furnace, including bedding charging means for charging a bedding carbonaceous material on a hearth of the moving-hearth reducing furnace; raw material charging means for placing carbonaceous material-containing agglomerates containing a powdery iron oxide source and a powdery carbonaceous reductant on the bedding carbonaceous material; heating means for thermally reducing the carbonaceous material-containing agglomerates while moving the hearth in the moving-hearth reducing furnace to generate solid reduced iron and simultaneously thermally carbonizing the bedding carbonaceous material to generate char; classifying means for classifying the solid reduced iron and the char into a coarse particle portion having an average particle diameter of 1 mm or more and the rest, a fine particle portion without substantial cooling; melting furnace charging means for continuously charging only the coarse particle portion into the iron bath-type melting furnace from thereabove; and oxygen blowing means for blowing oxygen-containing gas into the iron bath-type melting furnace to melt the solid reduced iron and to thereby generate molten iron.

According to the molten iron production apparatus of the present invention described above, easily scatterable char is classified into a coarse particle portion and a fine particle portion by the classifying means, and only the coarse particle portion is charged into the iron bath melting furnace by the melting furnace charging means. Thus, even when charging is conducted continuously, the amount of carbonaceous materials scattered into the discharge gas of the iron bath melting furnace can be significantly reduced and the yield of the carbonaceous materials used during the production of molten iron can be improved.

A molten steel production apparatus of another aspect of the present invention achieving the object is an apparatus for producing molten iron with a combination of a moving-hearth reducing furnace and an iron bath-type melting furnace, including bedding charging means for charging a bedding carbonaceous material on a hearth of the moving-hearth reducing furnace; raw material charging means for placing carbonaceous material-containing agglomerates containing a powdery iron oxide source and a powdery carbonaceous reductant on the bedding carbonaceous material; heating means for thermally reducing the carbonaceous material-containing agglomerates while moving the hearth in the moving-hearth reducing furnace to generate solid reduced iron and simultaneously thermally carbonizing the bedding carbonaceous material to generate char; agglomerating means for hot-forming the solid reduced iron and the char into agglomerates without substantial cooling; melting furnace charging means for continuously charging the agglomerates into the iron bath-type melting furnace from thereabove; and oxygen blowing means for blowing oxygen-containing gas into the iron bath-type melting furnace to melt the solid reduced iron and to thereby generate molten iron.

According to the molten steel production apparatus of the present invention described above, easily scatterable char is agglomerated together with the solid reduced iron by the agglomerating means. Thus, even when charging is conducted continuously, the amount of carbonaceous materials scattered into the discharge gas of the iron bath melting furnace can be significantly reduced and the yield of the carbonaceous materials used during the production of molten iron can be improved.

In the molten iron production apparatus of the present invention, the agglomerating means may be a briquetting machine or a compacting machine. When a briquetting machine is used as the agglomerating means, scattering of char can be further securely prevented. Moreover, the sensible heat of the solid reduced iron F can be more effectively utilized. A compacting machine, which conducts only compaction without forming the material into coal balls, is also an inexpensive and effective option since char and fine particles of reduced iron can be fixed.

The molten iron production apparatus of the present invention described above may further include a baffle for suppressing dispersion of the char into discharge gas, the baffle being disposed at a roof of the iron bath-type melting furnace and between an inlet of the char and an outlet of the discharge gas from the iron bath-type melting furnace. In this manner, the gas stream from the reduced iron inlet of the iron bath-type melting furnace along the roof is turned into a downward stream by the baffle, and the char carried with the gas stream easily reaches the molten bath surface with the downward stream, thereby effectively suppressing dispersion into the melting furnace discharge gas.

The molten iron production apparatus of the present invention may further include guiding means for guiding the char to a molten bath surface in the iron bath-type melting furnace, the guiding means being disposed at an inlet of the char. In this manner, the downward solid stream in the iron bath-type melting furnace is secured, and the char easily reaches the molten bath surface. Thus, the char can be more effectively prevented from being trapped in the gas stream along the roof and discharged together with the melting furnace discharge gas.

This application claims benefit of Japanese Patent Application No. 2006-120900 filed on Apr. 25, 2006, which is hereby incorporated by reference.

The invention claimed is:

1. A process for producing molten iron with a combination of a moving-hearth reducing furnace and an iron bath-type melting furnace, comprising:
   charging a bedding carbonaceous material on a hearth of the moving-hearth reducing furnace and placing carbonaceous material-containing agglomerates containing a powdery iron oxide source and a powdery carbonaceous reductant on the bedding carbonaceous material;
   thermally reducing the carbonaceous material-containing agglomerates while moving the hearth in the moving-hearth reducing furnace to generate solid reduced iron and simultaneously thermally carbonizing the bedding carbonaceous material to generate char;
   hot-forming the solid reduced iron and the char into agglomerates without substantial cooling; wherein the char prevents the solid reduced iron from adhering onto rollers in the moving hearth furnace and scattering of the char;
   continuously charging the agglomerates while the agglomerates are still hot into the iron bath-type melting furnace from thereabove; and
   blowing oxygen-containing gas into the iron bath-type melting furnace to melt the solid reduced iron and to thereby generate molten iron.

2. The process for producing molten iron according to claim 1, wherein, in the step of generating the molten iron, the oxygen-containing gas is blown in from a plurality of lances, and the amount of gas blown in from some of the lances is smaller than that from the rest of the lances.

* * * * *